United States Patent
Dehn et al.

(10) Patent No.: US 7,490,533 B2
(45) Date of Patent: Feb. 17, 2009

(54) METHOD FOR MAKING A FORM-FITTING CONNECTION BETWEEN A TOOL INSERT AND A TOOL HOLDER OF A ROTATING TOOL

(75) Inventors: Gerhard Dehn, Mölln (DE); Christian Gutsche, Wentorf (DE); Michael Kugolowski, Geesthacht (DE)

(73) Assignee: Fette GmbH, Schwarzenbek (DE)

( * ) Notice: Subject to any disclaimer, the term of this patent is extended or adjusted under 35 U.S.C. 154(b) by 157 days.

(21) Appl. No.: 11/486,452

(22) Filed: Jul. 13, 2006

(65) Prior Publication Data
US 2007/0011860 A1  Jan. 18, 2007

(30) Foreign Application Priority Data
Jul. 13, 2005  (DE) .................. 10 2005 032 653

(51) Int. Cl.
*B21K 5/02* (2006.01)
(52) U.S. Cl. .................. 76/101.1; 76/108.2; 407/33; 407/113; 407/103
(58) Field of Classification Search .......... 407/33, 407/40, 48, 53, 54, 103, 113; 82/1.11; 76/108.2, 76/108.4
See application file for complete search history.

(56) References Cited

U.S. PATENT DOCUMENTS

| | | | | |
|---|---|---|---|---|
| 3,629,919 A * | 12/1971 | Trevarrow, Jr. | ............ | 407/103 |
| 4,722,642 A | 2/1988 | Musacchia, Jr. | | |
| 5,607,263 A * | 3/1997 | Nespeta et al. | ............ | 407/61 |
| 5,810,518 A * | 9/1998 | Wiman et al. | ............ | 407/102 |
| 5,863,162 A * | 1/1999 | Karlsson et al. | ............ | 408/230 |
| 5,924,826 A * | 7/1999 | Bystrom et al. | ............ | 407/103 |
| 5,931,613 A * | 8/1999 | Larsson | ............ | 407/103 |
| 5,947,660 A * | 9/1999 | Karlsson et al. | ............ | 408/230 |
| 6,102,630 A * | 8/2000 | Flolo | ............ | 407/42 |
| 6,146,060 A * | 11/2000 | Rydberg et al. | ............ | 407/40 |
| 6,261,032 B1 * | 7/2001 | Duwe et al. | ............ | 407/110 |
| 6,626,614 B2 * | 9/2003 | Nakamura | ............ | 408/59 |
| 6,880,437 B2 * | 4/2005 | Sjoo et al. | ............ | 82/158 |
| 6,921,234 B2 * | 7/2005 | Arvidsson et al. | ............ | 407/103 |
| 7,001,114 B2 * | 2/2006 | Blucher et al. | ............ | 407/103 |
| 7,121,771 B2 * | 10/2006 | Englund | ............ | 407/103 |
| 7,201,545 B2 * | 4/2007 | Ejderklint | ............ | 409/131 |
| 7,325,471 B2 * | 2/2008 | Massa et al. | ............ | 82/1.11 |
| 2003/0059264 A1 * | 3/2003 | Hannson et al. | ............ | 407/66 |

(Continued)

FOREIGN PATENT DOCUMENTS

DE    3402547 A1 *   8/1985

(Continued)

*Primary Examiner*—Boyer D Ashley
*Assistant Examiner*—Sara Addisu
(74) *Attorney, Agent, or Firm*—Vidas, Arrett & Steinkraus, P.A.

(57) ABSTRACT

Method for making a form-fitting connection between a tool insert and a tool holder of a rotatingly driven tool, wherein the tool holder has bearing surfaces by which forces or torques are transmitted to the tool insert, wherein the tool insert is made from a material harder than that of the tool holder and by sintering a green compact of powder. A sintered green compact for the tool insert is used as a hob, by which the bearing surfaces in tool holders are manufactured by punching or press-forming.

13 Claims, 3 Drawing Sheets

U.S. PATENT DOCUMENTS

2004/0108145 A1* 6/2004 Siracki .................. 175/331

FOREIGN PATENT DOCUMENTS

| DE | 4244316 A1 * | 6/1994 |
| DE | 196 28 428 A1 | 1/1998 |
| DE | 198 48 045 A1 | 4/2000 |
| DE | 101 36 293 A1 | 2/2003 |
| EP | 0 802 006 A1 | 11/1997 |
| WO | 99/41513 | 8/1999 |

* cited by examiner

METHOD FOR MAKING A FORM-FITTING CONNECTION BETWEEN A TOOL INSERT AND A TOOL HOLDER OF A ROTATING TOOL

CROSS-REFERENCE TO RELATED APPLICATIONS

Not applicable.

STATEMENT REGARDING FEDERALLY SPONSORED RESEARCH

Not applicable.

BACKGROUND OF THE INVENTION

From DE 101 362 93 A1, the entire contents of which is hereby incorporated by reference in its entirety, a thread former or tap with a shaft and a separate profile element is provided as a forming or cutting profile section, which is centrically and splinedly attachable on the shaft by means of a fastening device. The profile element is plate-shaped and has a running-in or lead cone, respectively. High spots and/or pits are formed on the end surfaces of the shaft and on the side surface of the profile element facing it, which form-fittingly engage into each other. Through this, an automatic centering of the profile element on the shaft takes place when the profile element is put on the shaft. In addition, a torque transmission from the shaft to the plate-shaped profile element takes place by the form-fitting connection. The profile element is fixed on the shaft by means of a centrical screw in an axial threaded bore. The high spots can be formed by radial ribs and the pits by radial grooves. The profile element is made from a hard metal, ceramics or the like. The shaft is made from a suitable tool steel, for instance. In the known thread former or tap, the provision of a multiplicity of different profile elements with different diameter, different lead and so on is possible for the purpose of connection with a standardized shaft. As a consequence, only the profile element is required to be made from a suitable hard material. As a consequence, the expense of material is significantly reduced.

It is usual to manufacture tools and tool inserts from a green compact of a powder of a hard material by the sintering method. This is also invited in the profile element of the known tool. The high spots and the pits for a bearing surface around tool holders are made by cutting operation. Even the most accurate cutting operation can not avoid the occurrence of dimension variations. However, the dimension variations affect the precise arrangement of the profile elements on the tool shaft and they influence the torque transmission behaviour in the use.

The present invention is based on the objective to provide a method for making a form-fitting connection between a tool insert and a tool holder of a rotating tool which is free from float.

BRIEF SUMMARY OF THE INVENTION

In the method according to the invention, a sintered green compact for the tool insert is used as the hob by means of which the bearing surfaces in the tool holder are made by press-forming.

When pressing and sintering a tool insert, the bearing surfaces on the tool insert which co-operate with bearing surfaces of the tool holder can be formed at the same time through corresponding realisation of the pressing tool. The method according to the present invention makes use of this, as well as of the fact that the tool insert is harder than the tool holder. Thus, in the method according to the invention, one sintered green compact out of a multiplicity of equal green compacts for cutting inserts is used as a hob. With the aid of the hob, the bearing surfaces are punched into tool holders by the stamping method.

The method according to the present invention has the advantage that a float between the bearing surfaces of the tool insert at the one hand and the tool holder on the other hand does not occur, because both bearing surfaces originate from one original form, which is formed by the pressing tool for making the green compacts for the tool inserts. Conventionally, bearing surfaces are made by cutting form-giving, which naturally does not exclude a float. Deviations with respect to prescribed dimensions in this "original tool" are reproduced in the green compact and are in turn transmitted to the tool holder. The sintered green compacts from which tool inserts are made have also the deviations of the original tool, so that the bearing surfaces of tool insert and tool holder engage accurately into each other, i.e. without float.

It is to be understood that the described advantage is obtained essentially only in the case when the sintered green compact used as a hob as well as the tool inserts are produced with the same tools of the powder press.

The present invention can be used everywhere where tool inserts co-operate form-fittingly with a tool holder, in the cutting tips of a milling cutter which are held on bearing surfaces of the tool holder, for instance (e.g. as in DE 198 48 045 C2, the entire contents of which is hereby incorporated by reference in its entirety).

According to one embodiment of the present invention, it is provided that the method according to the invention is also used for tools with a shaft as the tool holder and with a thread former or a cutting tool as a tool insert, the tool insert being arranged axially and centrically to the shaft in this. The tool insert is preferably made from a solid hard material and the tool holder from a suitable tool steel.

According to one embodiment of the present invention, the bearing surfaces are formed with prismatic high spots and pits. Alternatively, the bearing spots are formed by gear teeth on the ends of tool insert and tool holder, wherein the crowns and bottoms of the teeth are arranged radially in equal distances from each other in the perimeter direction.

In the known tool described above, the bearing surfaces are such that tool holder on the one hand and profile element on the other hand can occupy different turning positions with respect to each other. However, as there can be dimensional differences when seen in the perimeter direction, it is advantageous according to a further embodiment of the present invention when the bearing surfaces have an indexing such that the bearing surfaces of tool insert and tool holder can be brought into form-fitting engagement in only one turning position with respect to each other.

For instance, the indexing may be obtained in that one high spot or pit is dimensioned differently with respect to the others, so that in this manner the form fit can be obtained only by bringing the prismatic high spot and pit in engagement with each other.

The method according to the invention does not only lead to greater precision in the match of tool insert and tool holder, but it makes also possible a very economic production method. Further, a higher stability on the bearing surfaces is also attained by the method according to the present invention. In each case it is greater than in the production of the bearing surfaces by a cutting operation.

BRIEF DESCRIPTION OF THE SEVERAL VIEWS OF THE DRAWINGS

The present invention will be explained in more detail below by means of drawings of shown examples of its realisation.

DETAILED DESCRIPTION OF THE INVENTION

Figure 1:
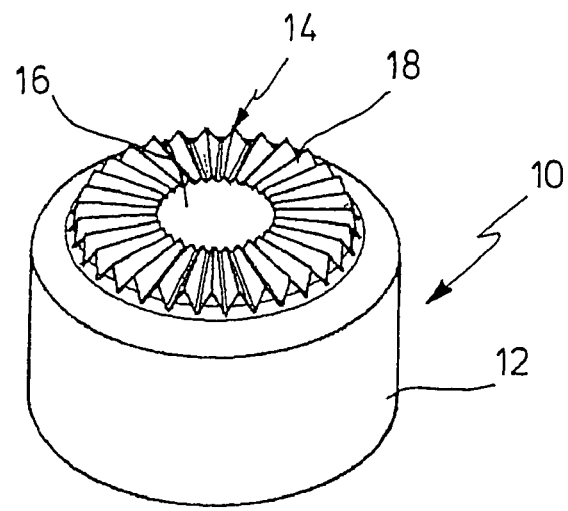
FIG. 1 shows a sintered green compact for the execution of the method according to the present invention.

While this invention may be embodied in many different forms, there are described in detail herein a specific preferred embodiment of the invention. This description is an exemplification of the principles of the invention and is not intended to limit the invention to the particular embodiment illustrated In FIG. 1, a sintered green compact 10 can be recognised, which has a cylindrical body 12, the one end surface of which is provided with gear teeth 14. The green compact 10 is formed from a hard metal or tool ceramics and serves as a profile element for a thread former according to DE 101 36 293 A1 described above, for instance. For this purpose, a green compact body corresponding to the green compact according to FIG. 1 is cutting processed, in order to provide it with a suitable tool profile (cutting edges, grooves and the like). However, in the method described below such processing is not undertaken with the green compact 10, instead it remains unprocessed and is taken as a hob for a stamping operation.

As is known, the green compact 10 is produced in a powder press by means of an upper and a lower stamp, which co-operate with a die. The gear teeth 14 are usually formed by the suitably formed lower stamp. The upper stamp acts on the opposite side and has a flat front surface, for instance. In addition, an axial circular bore 16 is formed.

It is not obligatory that the cylindrical body 12 has the same height as have the green compacts which are subsequently subjected to a form-giving cutting operation to yield profile elements or cutting inserts, respectively. How high or long, respectively, the cylindrical body 12 is, depends only from the powder amount and the path length of the upper stamp.

Figure 2:
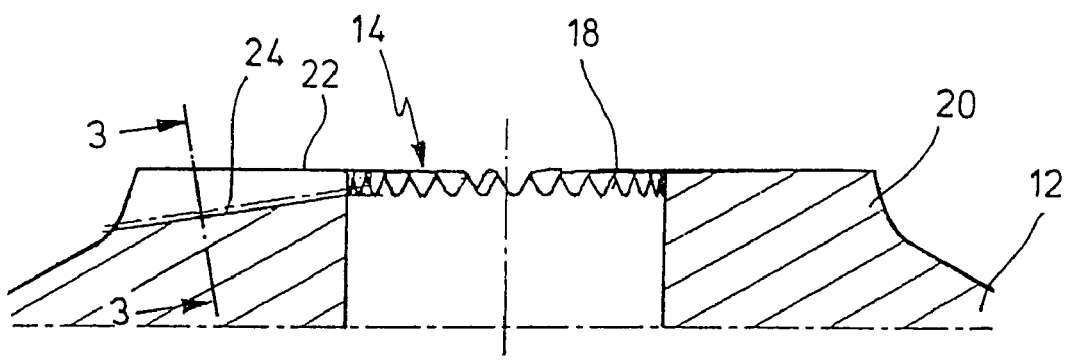
FIG. 2 shows a section through the green compact according to FIG. 1
Figure 3:
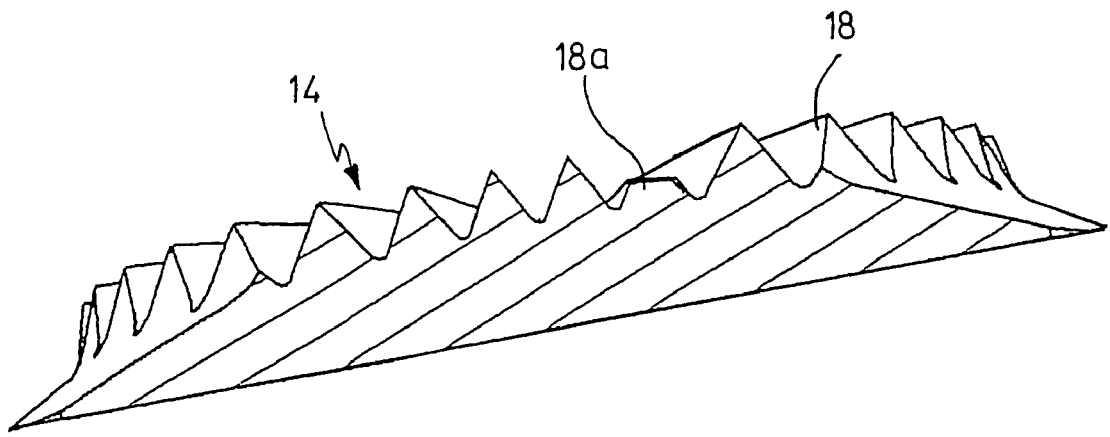
FIG. 3 shows a section through the representation according to FIG. 2 along the line 3-3.
Figure 4:
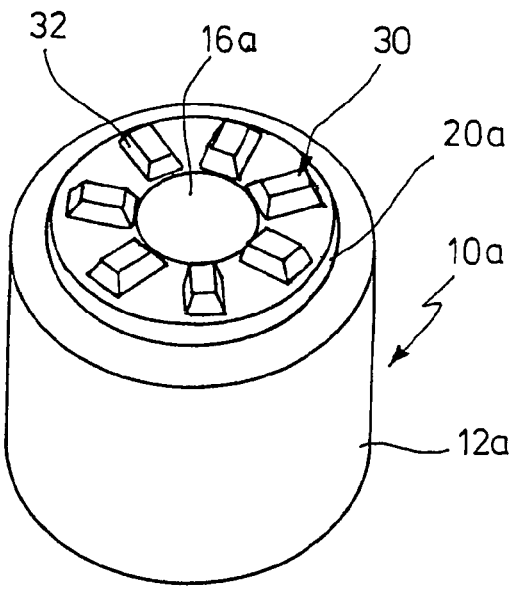
FIG. 4 shows a perspective view of another embodiment of a green compact as a hob for the execution of the method according to the present invention.
Figure 5:
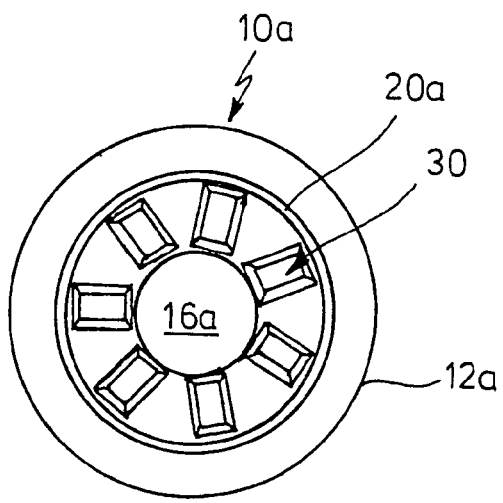
FIG. 5 shows the final view of the green compact according to FIG. 4

In the case of the FIGS. 1 to 3, special gearing teeth 14 are formed in the green compact 10. Individual teeth 18 are arranged in uniform perimeter distances from each other with their radial crowns. The bottom in the tooth gaps is also formed by only one line, as results from the overall view of the FIGS. 1 to 3. The gearing teeth 14 are formed in a somewhat elevated portion 20 of the body 12, wherein the crown lines 22 lay in a plane perpendicular to the axis of the cylindrical body 12, whereas the bottom lines 24 are inclined about a small angle thereto, as results from FIG. 2. Thus, there are front gearing teeth 14.

With the aid of the green compact 10, a hob is obtained, with the aid of which complementary teeth are formed in a tool holder, the end of a tool shaft for instance. Such a tool shaft with a complementary punching is not shown here. As a consequence, a tool insert, for instance a profile element according to the thread former described above, can come into form-fitting engagement with the gearing teeth of the tool holder, the tool shaft in particular, with its own gearing teeth, which are similar to the gearing teeth 14. As the gearing teeth of the hob are made by the same powder press as the gearing teeth of the tool inserts, a high coincidence of dimension and form exists between the gearing teeth of tool insert and tool holder. As a consequence, a great torque can be transmitted, in particular also by means of the form of the gearing teeth shown in FIGS. 1 to 3.

As can be recognised from FIG. 3, one tooth 18 a is formed in a flattened manner. Thus, a complementary pit is formed when the counter profile is formed in the tool holder. As a consequence, it is possible to bring the profiles of tool insert and tool holder form-fittingly together only when the tooth 18 a is aligned to the complementary pit 18 a. Thus, the indexing provides that tool insert and tool holder are always form-fittingly connected in the proper turning position with respect to each other.

In the FIGS. 4 to 7, two different embodiments for the realisation of bearing surfaces for form-fitting connection of tool insert and tool holder are represented. In the FIGS. 4 and 5, a green compact 10 a with a cylindrical body 12 a and a bore 16 a can be recognised. One recognises that a series of prismatic high spots 30 is formed on an elevated portion 20 a on one end of the cylindrical body 12 a. The prismatic high spots 30 are arranged radially and are set in a series at equal distances from each other. They have slant side surfaces 32, through which the high spots 30 taper towards the free end.

Figure 6:
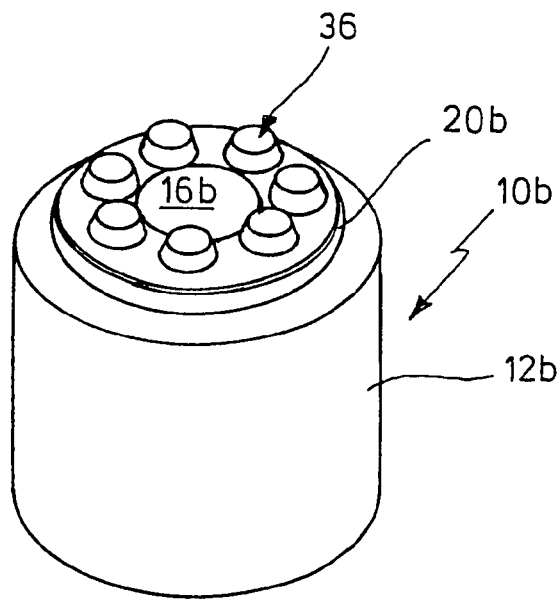
FIG. 6 shows a perspective view of another embodiment of a green compact, usable as a hob for the execution of the method according to the present invention.
Figure 7:
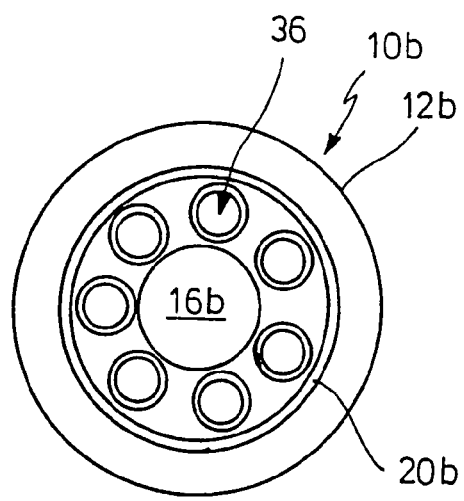
FIG. 7 shows the final view of the green compact according to FIG. 6.

In the embodiment according to FIGS. 6 and 7, a series of round naps 36, flattened on their upper ends, are formed on an elevation 20 b of the cylindrical body 12 b. The naps 36 are arranged on a circle coaxial to the axis of the cylindrical body 12 b and are set in a series at equal distances from each other. When used as a hob, a complementary profile is formed in the tool holder, so that upon connection of the tool inserts with the tool holder, a form-fitting engagement of the profiles is then ensured. Even in the embodiments according to the FIGS. 4 to 7, an indexing as described above is functional, i.e. a connection of tool insert and tool holder is possible only in a predetermined relative turning position of the two parts with respect to each other. For instance, a prismatic higher spot 30 or a nap 36 which has less or greater height than all the others can be formed.

Figure 8:
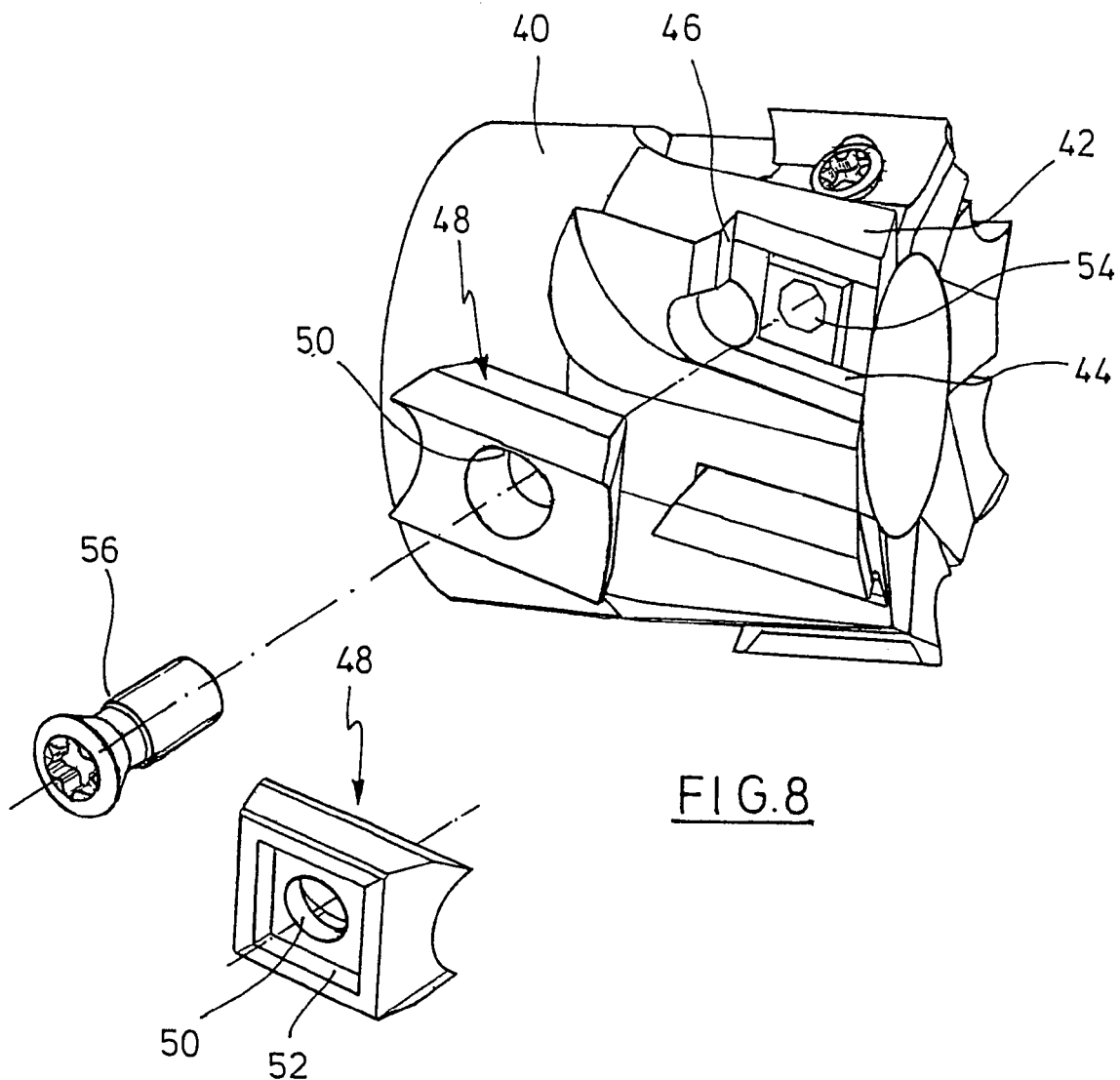
FIG. 8 shows a cutting tool with cutting tips, in a perspective view.

In FIG. 8, a cutting tool is shown, with a shaft-like cutting body 40, which has chambers in perimeter spacings on one end, which have bearing surfaces 42, 44, 46 for cutting tips 48. The cutting tips have a bore 50 and a rectangular frame 52 on the rear side, which co-operates with the cutting tips 42 to 46. At the bottom of the chambers, a threaded bore 54 is formed, into which an attachment screw 56 is screwed in when the cutting tips 48 of the chambers are fixed with the aid thereof.

It will not be dealt in more detail with the realisation of the cutting tips 48. They are made of a very hard material, of hard metal for instance, and the bearing surfaces 42 to 46 are formed in the holder 40 with the aid of a sintered cutting tip

48. Thus, any cutting operating is avoided. An accurate form fitting connection is achieved between the cutting tips 48 and the bearing surfaces.

Figure 9:
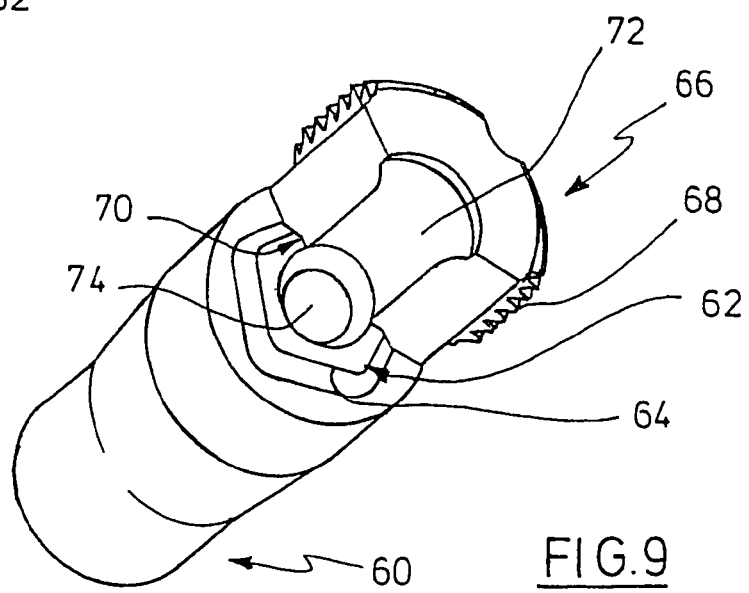
FIG. 9 shows a thread forming tool in a perspective view.

In FIG. 9, a tool holder in the form of a shaft 60 can be recognised, which has a prismatic higher spot 62 of pentagonal contour with slant surfaces 64 on its face. A profile element 66 with thread forming profile 68 has a profile 70 complementary to the prismatic higher spot 62 at a front end, through which profile element 66 and shaft 60 engage form-fittingly into each other. The profile element 66 has a centrical bore 72, which is aligned to an axial bore 74 of the shaft 60. With the aid of a not shown screw, the profile element 66 can be screwed down against the shaft 60.

In turn, the profile on the face of the shaft 60 can be produced with the profile of the profile element 66 in the already described manner by punching or press-forming.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of making a form-fitting connection between a tool insert and a tool holder of a rotatingly driven tool, the method comprising:
   providing a green compact of a first material;
   forming a first bearing surface on the green compact by pressing the green compact;
   sintering the green compact to form a tool insert;
   providing at least one tool holder comprised of a second material, the second material being made of a material softer than the first material;
   pressing the tool insert against the second material of the at least one tool holder to form a second bearing surface on the tool holder, wherein the first bearing surface and the second bearing surface matingly engage.

2. The method of claim 1, further comprising forming indexing on the first bearing surface and the second bearing surface.

3. The method of claim 1, further comprising forming raised portions on at least one of the first bearing surface and the second bearing surface.

4. The method of claim 3, wherein the first bearing surface has a first perimeter and the second bearing surface has a second perimeter, the raised portions being formed on at least one of the first perimeter or the second perimeter.

5. The method of claim 3, wherein the raised portions are prism shaped.

6. The method of claim 3, wherein the raised portions are rounded.

7. The method of claim 3, wherein the raised portions are formed axisymmetrically and centrical on at least one of the first bearing surface and the second bearing surface.

8. The method of claim 1, further comprising forming gear teeth on the first bearing surface and the second bearing surface.

9. The method of claim 8, wherein the gear teeth have crowns and bottoms, and wherein the first bearing surface has a first perimeter and the second bearing surface has a second perimeter, the teeth being formed on at least one of the first perimeter or the second perimeter, the crowns and bottoms of the teeth being uniformly spaced apart and arranged radially about the first perimeter and the second perimeter.

10. The method of claim 1, wherein the green compact is a metal.

11. The method of claim 1, wherein the green compact is a ceramic.

12. The method of claim 1, wherein the tool insert is a solid hard metal and the tool holder is a tool steel.

13. The method of claim 1, wherein pressing the green compact comprises:
   providing a die for holding the green compact; and
   providing a powder press, the powder press having an upper stamp and a lower stamp, the upper and lower stamp cooperating with the die.

* * * * *